3,343,917
OBTAINING PALEOENVIRONMENTAL
INFORMATION
Gerald M. Friedman, Tulsa, Okla., assignor to Pan American Petroleum Corporation, Tulsa, Okla., a corporation of Delaware
No Drawing. Filed Nov. 22, 1963, Ser. No. 325,749
5 Claims. (Cl. 23—230)

ABSTRACT OF THE DISCLOSURE

Determining paleoenvironmental information for use in prospecting for subterranean deposits of petroleum. Calcareous sedimentary rock samples in the area to be explored are collected. The bulk rock samples are examined or analyzed to determine carbonate mineralogy. The rock is next microscopically examined for identification of fossil fragments to determine the existence of those composed of low-magnesium calcite and known to have been originally deposited as such low-magnesium calcite which is a stable phase carbonate. It is next determined what trace elements, i.e., iron, manganese and barium, are present in such low-magnesium calcite. The quantitative evaluation of such trace elements indicates the nature of the environment in which the original fossil was laid down. This is useful for further exploration work by geologists in their various studies in seeking indications of the presence of petroleum deposits.

---

This invention relates to determining paleoenvironmental information for use in geochemical prospecting and particularly with geochemical prospecting for valuable deposits of oil and gas.

It is generally believed that oil and gas are more often associated with marine or salt water sediments than with nonmarine or fresh-water sediments. Accordingly, a convenient method of classifying samples of sedimentary formations as to whether they are of marine or nonmarine origin is of distinct value in evaluating the likelihood of occurrence of petroleum deposits.

Calcareous sediments are composed chiefly of biogenetic fragments. The biogeochemistry of the shells or skeletons of organisms contributing to the sediments reflects some of the variables in the chemistry of the environment of deposition. An important factor determining the chemistry of the deposited shells is the presence of certain trace elements in the waters in which the organisms live. The trace element composition of fresh-water differs from that of seawater, and, consequently, the geochemistry of calcareous deposits will vary according to the depositional environment thereof.

Various geochemical prospecting methods have heretofore been proposed for obtaining information indicative of the presence of mineral deposits. Generally speaking, these methods have employed the determination of various hydrocarbon constituents, bacteria, isotopes, trace elements, etc., to indicate the presence of subterranean deposits, such as oil and gas. However, the usefulness of such methods is generally limited to special situations, and the accuracy of determination is affected by chemical changes occurring after deposition.

A primary object of the present invention is a method of determining paleoenvironmental information for use in exploring for valuable deposits of oil and gas by measurements which indicate the ecology of selected stable calcareous deposits (as hereinafter defined). A particular object is a method of determining, by measurements related to the depositional environment of the sediment, whether a given sedimentary formation is of marine or nonmarine origin. Other objects of the invention will become apparent from a reading of the following description of the invention.

The present invention is based primarily upon the correlation of quantitative determinations of trace elements in selected stable sediments contained in sedimentary calcareous earth deposits with the composition of the environment at the time of deposition. Of particular usefulness for this purpose are the trace elements barium, iron and manganese, which may be correlated with the sample locations to indicate former marine, nonmarine or lagoonal areas.

It has been determined that the average amount of barium in seawater is about 0.05 p.p.m., while in fresh-water, the barium content may vary widely so that it may exceed that of seawater, may be less, or may be approximately the same. The average iron content of seawater has been found to be approximately 0.008 p.p.m., in contrast to an average of about 1.0 p.p.m. for river water. The approximate average manganese content of seawater is about 0.003 p.p.m., while for river water the average is about 0.03 p.p.m. manganese. In general, fresh-waters are weakly acid and, therefore, contain more soluble iron and manganese than do marine waters which are generally weakly alkaline. Iron- and manganese-bearing waters entering lagoons, bays or estuaries from rivers precipitate iron and manganese in the weakly alkaline brackish waters, and such lagoonal waters contain more iron and manganese for uptake by organisms than do waters of an open ocean environment. Representative values for the above trace elements in fresh-water and in seawater are shown in Table 1.

TABLE 1.—BARIUM, IRON AND MANGANESE CONTENT AND FRESH WATER

| Location | Ba (p.p.m.) | Fe (p.p.m.) | Mn (p.p.m.) |
|---|---|---|---|
| Fresh-Water: | | | |
| Apalachicola River, Blownstown, Florida | 0.021 | 1.220 | 0.025 |
| Colorado River, Yuma, Arizona | 0.128 | 0.111 | 0.037 |
| Yukon River, Mountain Village, Alaska | 0.109 | 1.130 | 0.181 |
| Churchill River, Churchill Manitoba | 0.033 | 0.185 | 0.008 |
| Susquehanna River, Conowingo, Maryland | 0.037 | 0.154 | 0.079 |
| MacKenzie River, at Arctic Red River, Northwest Territories | 0.070 | 1.030 | 0.020 |
| Marine Water: | | | |
| Trace Element Range | | 0.002–0.020 | 0.001–0.010 |
| Trace Element, Average Value | 0.050 | 0.008 | 0.003 |

A number of very recent mollusks taken from known environments, i.e., marine, lagoonal or nonmarine waters, were quantitatively analyzed for the trace elements barium, iron and manganese. Representative analyses are shown in Table 2 wherein are indicated the nature of the mollusks, the trace element contents and the location of the environment. These analyses indicate that nonmarine and lagoonal mollusks contain a greater abundance of barium, iron and manganese than do marine mollusks.

TABLE 2.—BARIUM, IRON AND MANGANESE CONTENT OF MARINE, LAGOONAL AND FRESH-WATER MOLLUSKS

| | Ba (p.p.m.) | Fe (p.p.m.) | Mn (p.p.m.) | Location |
|---|---|---|---|---|
| Marine: | | | | |
| Pelecypods: | | | | |
| Mercenaria mercenaria | 2.5 | 20 | ND | Long Island, N.Y. |
| Arca umbonata | 2.5 | ND | ND | Bermuda. |
| Gastropods: | | | | |
| Strombus pugilis | 1.0 | ND | ND | North Bimini Island, Bahamas. |
| Unidentified gastropod | 2.5 | ND | 17.5 | Bermuda. |
| Busycon sp | 2.5 | 20 | 7.1 | Horn Island, Miss. |
| Lagoonal: | | | | |
| Pelecypods: | | | | |
| Crassostrea virginica | 6 | 170 | 48 | Mississippi Sound, Miss. |
| Crassostrea virginica | 12 | 5,600 | 97 | Do. |
| Nonmarine: | | | | |
| Pelecypods: | | | | |
| Quadrula quadrula | 59 | 20 | 100 | Ohio River, near Cincinnati, Ohio. |
| Quadrula quadrula | 35 | 589 | 5,000 | Wabash River, near Terre Haute, Indiana. |
| Unidentified clam | 76 | 135 | 25 | Trinity River, Fort Worth, Texas. |
| Gastropods: | | | | |
| Physa sp | 75 | 84 | 72 | Trinity River, Dallas, Texas. |
| Physa sp | 100 | ND | 70 | Small stream, Tulsa, Oklahoma. |
| Praticolella berlanderiana | 22 | 140 | 62 | Trinity River, Fort Worth, Texas. |

ND=None detected.

When the shells and skeletons of organisms are deposited from the hydrosphere the resulting calcareous deposits may be formed of low-magnesium calcite, high-magnesium calcite and/or aragonite. As used herein, high-magnesium calcite refers to calcite containing more than 4 percent magnesium carbonate in solid solution, and low-magnesium calcite is that containing less than 4 percent magnesium carbonate in solid solution. The mineralogy of these deposits may change in the course of time, depending upon the mineralogical nature of the deposit, by the action of the post-depositional environment on the sediments and such changes are accompanied by changes in the trace elements contained in the deposits. For example, aragonite is subject to change over long periods of time, as well as high-magnesium calcite, and eventually these may form relatively stable low-magnesium calcite. Aragonite and high-magnesium calcite sediments may be classified as metastable deposits, while those sediments consisting primarily of low-magnesium calcite, which is relatively stable and does not change chemically over long periods of time, are referred to as stable deposits. Thus, those deposits originally laid down as aragonite or high-magnesium calcite will change over long periods of time, both mineralogically and chemically, and such deposits today are not truly representative of the depositional environment. On the other hand, those originally laid down as stable low-magnesium calcite represent more accurately the true environment when deposited.

Generally speaking, samples taken from calcareous deposits comprise mixtures of the various mineralogical forms mentioned above, and quantitative analyses of the whole sample would indicate the quantities of the above trace elements contained in the sample as a whole. Due to the aforementioned chemical change resulting from the transformation of the metastable deposits, such analyses are of no use in the practice of the present invention. Rather, in the practice of the invention, shells or fragments of shells of an organism which is known, or suspected of having been composed of, low-magnesium calcite in the depositional environment are determined in the sample, and such portions are selected for quantitative determinations of the trace elements. Of course, in order to determine the environment at the time of deposition, the sediments should be laid down contemporaneously. Care must be taken that no contaminants, such as clay minerals, quartz, other types of carbonates or the like are present in the portion of the sample taken for analysis. Macroscopic or microscopic examination may be employed initially in selecting the desired portion of the carbonate sample to be analyzed, and various well-known techniques, e.g., X-ray diffraction or the like, may be employed to determine whether other undesired minerals are present in the portion to be analyzed. After the desired portion of the sample has been segregated, it may be quantitatively analyzed for barium, iron, manganese and the like by methods well known to those skilled in this art. Typically, X-ray fluorescence, emission spectrometry, wet chemical analysis or other suitable forms of analysis may be employed in the quantitative determination of the trace elements.

In selecting the stable carbonates to be analyzed, the stable low-magnesium calcite mollusks or other organisms which were originally deposited may be readily differentiated from the low-magnesium calcite present at the time of examination which resulted from the transformation of the metastable carbonates. Certain mollusks, for example, are known to have originally been composed of low-magnesium calcite and the shells of such mollusks generally do not change mineralogically after deposition from their environment. For example, the shells of oysters, Pecten, Gryphaea, Exogyra and the like are composed of stable carbonates. Likewise, other organisms such as planktonic Foraminifera are likewise composed of stable carbonates. Other organisms having skeletons composed of the above stable carbonates are well known to those skilled in this art and are disclosed, for example, in the publication "Aspects of the Biogeochemistry of Magnesium, Part I—Calcareous Marine Organisms, and Part II—Calcareous Sediments in Rocks" by Keith E. Chave in the Journal of Geology, volume 62, pages 266–283 and 587–599 (1954). In general, the difference between marine and nonmarine organisms is independent of taxonomic rank, such as within the gastropod, pelecypod or other classes of organisms, and of the mineralogy of the shells. However, in a metastable carbonate the above trace elements are eliminated during the change from one mineralogical form to another.

In the practice of the present invention, a sufficient number of samples are taken from either surface or subsurface locations throughout an area which is to be explored to provide a true representation of the deposition of environment. Various well-known methods of taking the samples may be employed. After the samples are taken, the presence of stable carbonate minerals are determined, and the distribution of significant trace elements in the stable carbonate is quantitatively determined. Then, for example, the values of the quantities of barium, iron and/or manganese may be plotted on a map of the area after correlation with the locations of the corresponding samples.

Plots of the manganese content versus the barium content may be prepared from quantitative analyses of skeletal material of organisms taken from known environments, i.e., marine or fresh-water, and these will serve to readily ascertain the distinction between marine and fresh-water sedimentary deposits. For example, one typical plot indicates that a maximum of approximately 30 parts per million manganese and 30 parts per million barium is found in the bulk of the very recent marine organisms, while the bulk of the fresh-water organisms contained the trace elements barium and manganese in concentrations larger than these, e.g., 40 p.p.m. or more manganese and upwards of 40 p.p.m. barium. When similar plots were made including analyses of organisms taken from brackish or lagoonal waters, it was seen that the trace element values for these samples generally fell in between those values representative of the fresh-water and marine samples, for example, more than 30 p.p.m. manganese and less than 40 p.p.m. barium. However, a similar plot of the iron versus manganese concentrations in each of the lagoonal and marine samples revealed that, in general, the manganese and iron content of the lagoonal samples is noticeably greater than for the marine samples. Typically, the bulk of the lagoonal organisms contained 100 p.p.m. or more iron, while the marine samples contained generally less than this amount. Thus, such a plot may be used to ascertain the depositional environment of the carbonate material and distinguish between marine and lagoonal environments.

The foregoing description of the present invention has been given for the purpose of examplification and is not intended to limit the scope of the invention. From a reading of the foregoing, it is apparent that various modifications, falling within the spirit and scope of the invention, will become apparent to the artisan.

I claim:
1. The method of determining paleoenvironmental information for use in prospecting for subterranean petroleum deposits comprising:
 (a) collecting a plurality of contemporaneously deposited calcareous sedimentary rock samples at spaced points in an area to be explored;
 (b) determining the existence in said samples of carbonate minerals laid down as a stable phase;
 (c) separating such carbonate minerals of stable phase from said samples;
 (d) quantitatively determining trace elements only in said separated carbonate minerals of stable phase;
 (e) correlating the determined quantities of said trace elements with the corresponding sample locations in said area.

2. The method as defined in claim 1 in which said trace elements determined in step (d) are selected from the group consisting of iron, manganese and barium.

3. A method as defined in claim 1 including the step of preparing a plot of the quantitative content of one trace element versus a second trace element prepared from quantitative analysis of other carbonate material of the type determined in step (b) wherein such other carbonate material is taken from known environmental deposition and correlating such plot of this claim with the quantitative content of the same trace elements as determined in step (d) of claim 1.

4. The method of claim 1 wherein the carbonate mineral of stable phase of step (b) is a low-magnesium calcite.

5. A method as defined in claim 4 wherein said low-magnesium calcite is shell or fragments of shells of an organism having low-magnesium calcite in the depositional environment, and including the step of removing such shells or fragments of low-magnesium content from the sample prior to step (d).

References Cited

UNITED STATES PATENTS

| | | | |
|---|---|---|---|
| 2,278,929 | 4/1942 | Horvitz | 23—230 |
| 2,310,291 | 9/1943 | Horvitz | 23—230 |
| 2,336,612 | 12/1943 | Horvitz | 23—230 |
| 3,285,698 | 11/1966 | Clews | 23—230 |

MORRIS O. WOLK, *Primary Examiner.*

JOSEPH SCOVRONEK, *Examiner.*